(12) United States Patent
Frutschy et al.

(10) Patent No.: US 10,046,426 B2
(45) Date of Patent: Aug. 14, 2018

(54) HYDRAULIC RAM BOLT TENSIONING DEVICE

(71) Applicant: General Electric Company, Schenectady, NY (US)

(72) Inventors: Kristopher John Frutschy, Schenectady, NY (US); Kevin Joseph Barb, Schenectady, NY (US); Stephen Diana, Schenectady, NY (US); Edward Leo Kudlacik, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 410 days.

(21) Appl. No.: 14/989,357

(22) Filed: Jan. 6, 2016

(65) Prior Publication Data

US 2017/0190006 A1 Jul. 6, 2017

(51) Int. Cl.
*E04G 21/12* (2006.01)
*B23P 19/06* (2006.01)
*F16B 31/04* (2006.01)

(52) U.S. Cl.
CPC .......... *B23P 19/067* (2013.01); *F16B 31/043* (2013.01)

(58) Field of Classification Search
USPC .................... 254/29 A; 81/55, 57.38, 57.4
See application file for complete search history.

(56) References Cited

U.S. PATENT DOCUMENTS

| 3,844,533 | A | * | 10/1974 | Markiewicz | ............ B25B 29/02 254/29 A |
| 4,145,915 | A | | 3/1979 | Oertle et al. | |
| 4,268,011 | A | | 5/1981 | Randall | |
| 4,708,036 | A | * | 11/1987 | Vossbrinck | ............. B25B 29/02 254/29 A |
| 5,570,871 | A | * | 11/1996 | Westerfeld | ............. B25B 29/02 254/29 A |
| 2009/0078357 | A1 | | 3/2009 | Laxton | |

FOREIGN PATENT DOCUMENTS

EP 0 010 906 A1 10/1979

\* cited by examiner

*Primary Examiner* — Joseph J Hail
*Assistant Examiner* — Shantese McDonald
(74) *Attorney, Agent, or Firm* — Nixon & Vanderhye P.C.

(57) ABSTRACT

A bolt tensioning assembly includes a bolt having a through-hole extending longitudinally through the bolt. A ram is inserted into the through-hole. A top cap is configured to be attached to a first end portion of the bolt. A load distributing member is configured to engage the ram at a location adjacent a second end portion of the bolt to distribute a force exerted thereon by the ram, and an actuator is connected to the top cap to exert a force on the ram to cause the ram to engage the load distributing member such that the bolt is placed under tensile stress.

20 Claims, 13 Drawing Sheets

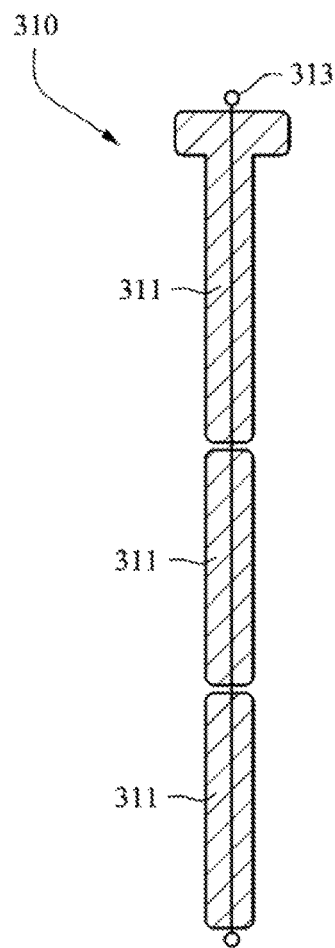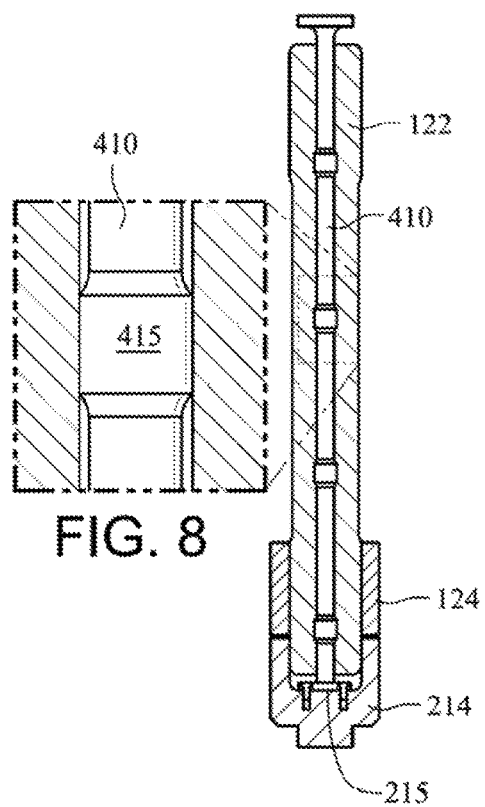
FIG. 6　　FIG. 8　　FIG. 7

HYDRAULIC RAM BOLT TENSIONING DEVICE

FIELD OF THE INVENTION

This invention relates generally to bolt tensioning devices, and more particularly to tensioning devices for bolts that are used to secure a turbine shell, valve, boiler, heat exchanger, condenser, or any hardware, which requires bolted fasteners of a certain size.

BACKGROUND OF THE INVENTION

Bolts are conventionally used to secure an upper portion of a turbine shell to a lower portion of the shell. Various methods may be used to tension the bolts. With hydraulic bolt tensioning, typically sufficient space along the upper flange of the turbine shell is necessary in order to provide landing zones to react the pull force. However, often there is insufficient space on the upper flange to provide appropriate landing zones.

BRIEF SUMMARY OF THE INVENTION

One aspect of the disclosed technology relates to a hydraulic stud stretching device configured such that no landing zones on a turbine flange are needed to react the pull force.

One exemplary but nonlimiting aspect of the disclosed technology relates to a bolt tensioning assembly, comprising a bolt having an elongated configuration, the bolt having a through-hole formed therein extending longitudinally through the bolt such that a pair of openings is respectively formed in opposed end faces of the bolt; a ram inserted into the through-hole in the bolt and extending therefrom; a top cap configured to be attached to a first end portion of the bolt; a load distributing member configured to engage the ram at a location adjacent a second end portion of the bolt to distribute a force exerted thereon by the ram; and an actuator connected to the top cap and configured to exert a force on the ram thereby causing the ram to engage the load distributing member such that the bolt is under tensile stress.

Another exemplary but nonlimiting aspect of the disclosed technology relates to a method of tensioning a bolt comprising providing a bolt having an elongate configuration, the bolt having a through-hole formed therein extending longitudinally through the bolt such that a pair of openings is respectively formed in opposed end faces of the bolt; inserting a ram into the through-hole; attaching a top cap to a first end portion of the bolt; providing a load distributing member at a location adjacent a second end portion of the bolt to engage the ram and receive a force exerted thereon by the ram; providing an actuator coupled to the top cap; and exerting a force on the ram with the actuator thereby causing the ram to engage the load distributing member such that the bolt is under tensile stress.

Other aspects, features, and advantages of this technology will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various examples of this technology. In such drawings:

FIG. 6 is a cross-sectional representation of a ram according to an example of the disclosed technology;

FIG. 7 is a cross-sectional representation of a ram according to another example of the disclosed technology;

FIG. 8 is an enlarged detail of FIG. 7;

DETAILED DESCRIPTION OF THE ILLUSTRATED EMBODIMENTS

Figure 1:
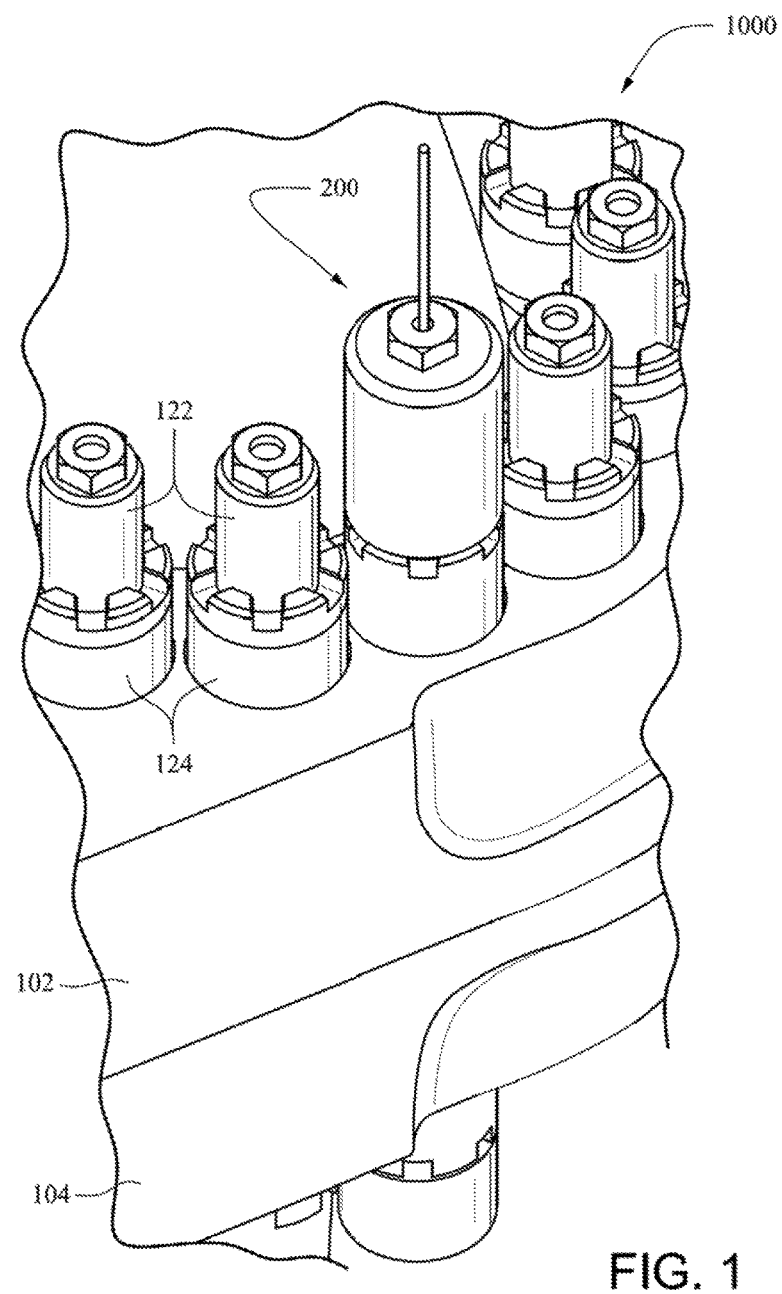
FIG. 1 is a partial perspective view of a section of a turbine shell having a hydraulic ram stud stretching device disposed thereon in accordance with an example of the disclosed technology.
Figure 2:
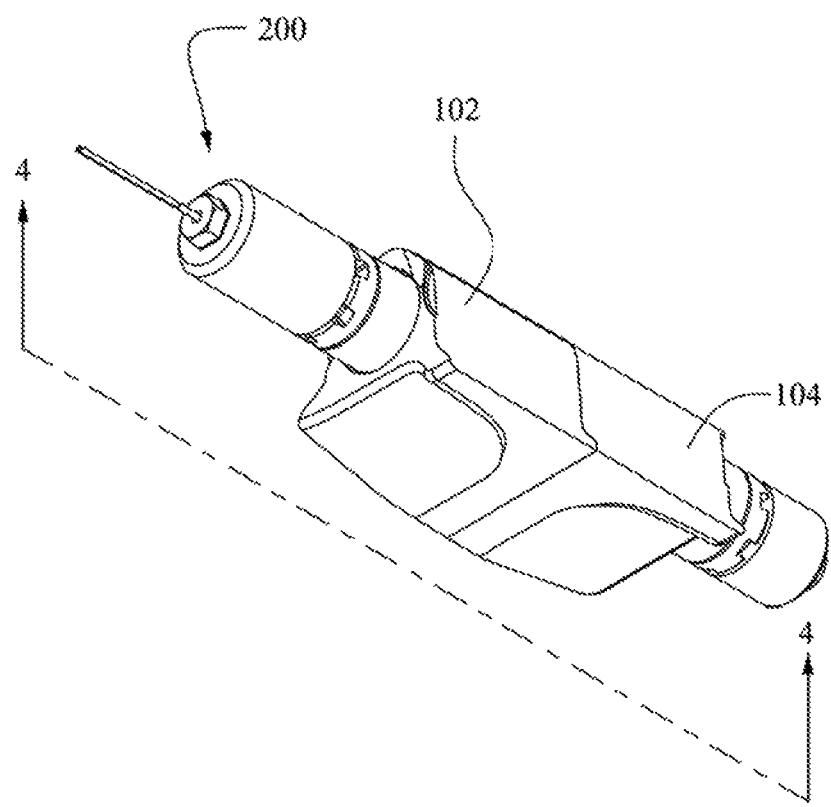
FIG. 2 is a perspective view of a section of the turbine shell of FIG. 1.

Referring to FIG. 1, a section of a turbine shell 1000 is shown. The turbine shell includes an upper flange 102 and a lower flange 104 held together by bolts 122 (i.e., studs) and nuts 124, as shown in FIGS. 1 and 2. As can be seen in FIG. 1, the bolts 122 extend beyond the nuts 124 thereby providing an exposed portion to receive components of a hydraulic ram stud stretching device 200. The hydraulic ram stud stretching device is used to stretch the bolts under tension, after which the nuts 124 are wound down to the flange surfaces and the hydraulic pressure in the stretching device is released to achieve preload tension in the bolts.

Figure 3:
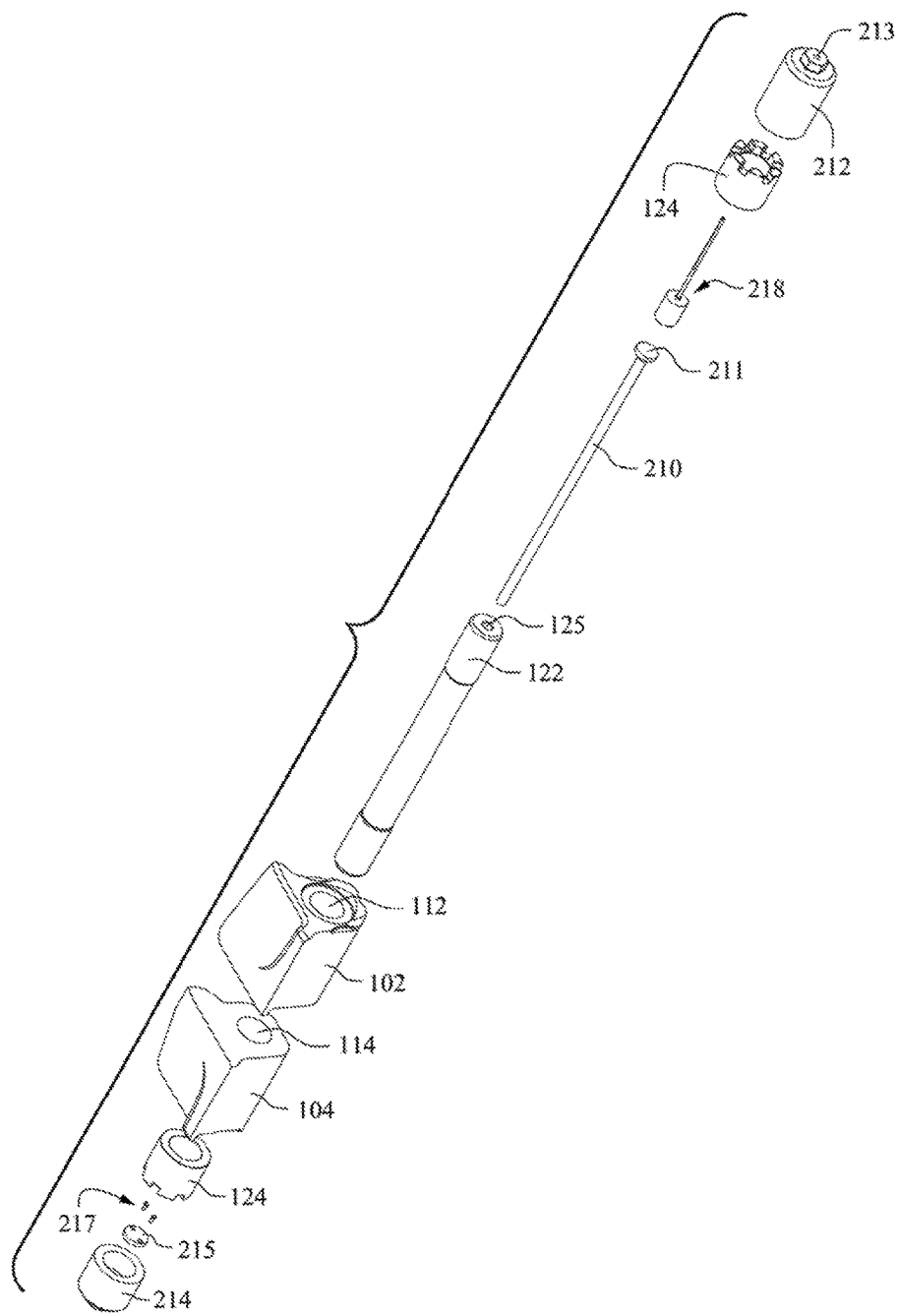
FIG. 3 is an exploded perspective view of the turbine shell section of FIG. 2.

In addition to the bolts 122 and nuts 124, the hydraulic ram stud stretching device 200 includes a ram 210, a top cap 212, a bottom cap 214, a load distributor disk 215, and a hydraulic actuator 218, as can be seen in FIG. 3.

Figure 4:
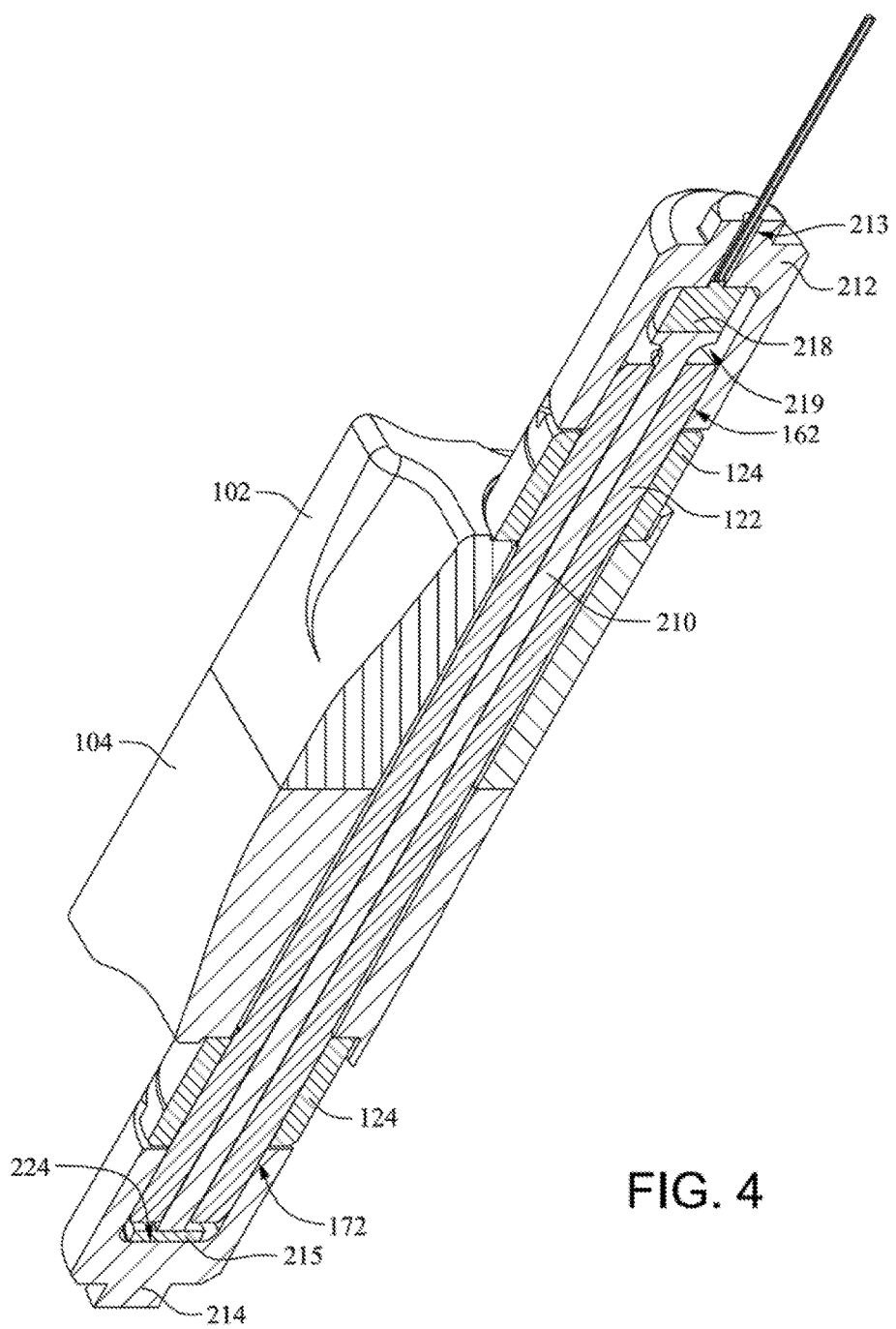
FIG. 4 is cross-sectional view along the line 4-4 in FIG. 2.

Referring to FIGS. 3 and 4, it can be seen that the bolt 122 has an elongate configuration and a through-hole 125 extending longitudinally through the bolt. Through-hole 125 forms openings in opposed end faces of the bolt. Ram 210 is slidably received in through-hole 125 such that a portion of the ram having a head 211 remains exposed from the through-hole. Ram 210 may be formed from a high-strength material (e.g., tungsten carbide).

Through-hole 125 may be used in a thermal stud stretching process and thereby enables thermal stretching to be used as a backup option for tensioning the bolts. Additionally, mechanical torqueing can also be used as another backup option.

Referring to FIGS. 1, 3 and 4, the bolt is configured to pass through a through-hole 112 in the upper flange 102 and a through-hole 114 in the lower flange 104. A pair of nuts 124 is threaded onto the upper and lower ends of the bolt 122 so as to be disposed, respectively, against the upper flange 102 and the lower flange 104.

As mentioned above, the bolt 122 has a length that allows it to extend beyond both nuts 124 thus providing an upper exposed portion 162 and a lower exposed portion 172 of the bolt, as can be seen in FIGS. 1 and 4. The upper exposed portion 162 and the lower exposed portion 172 may extend beyond their respective adjacent nut 124 a distance approximately equal to a diameter of the bolt 122. A top cap 212 is configured to attach to the upper exposed portion 162. For example, the top cap 212 may be threaded onto the upper exposed portion 162. The top cap 212 may have a hollow interior or cavity 219 with an open bottom to receive the upper exposed portion 162 of the bolt. The cavity 219 may form a pressure chamber, as will be later described.

As shown in FIGS. 3 and 4, the top cap 212 has a channel 213 extending from an outer surface of the top cap to the cavity 219. A hydraulic actuator 218 may be situated within the cavity 219 and configured to engage the top cap 212 and the head 211 of the ram 210. Pressure may be increased to displace the hydraulic actuator 218 causing a compressive force to be exerted on the ram 210, which in turn causes the ram to move relative to the bolt 122.

The hydraulic actuator 218 may comprise a hollow cylinder to which high pressure hydraulic fluid is pumped via a hose. An actuator plate may be located at a top or a bottom of the hollow cylinder. The actuator plate extends axially when hydraulic fluid is pumped into the hydraulic actuator 218. A spring member inside the hollow cylinder may be attached to the actuator plate to retract the actuator plate when the hydraulic pressure is released. In other examples, instead of the hydraulic actuator, other suitable actuators may be used (e.g., a piezoelectric electric actuator, a pneumatic actuator, or an electro-magnetic actuator).

Referring to FIG. 4, a bottom cap 214 is configured to attach to the lower exposed portion 172 of the bolt 122. For example, the bottom cap 214 may be threaded onto the lower exposed portion 172. The bottom cap 214 may have a hollow interior with an open top to receive the lower exposed portion 172 of the bolt. A load distributor disk 215 is seated on a bottom wall 224 of the bottom cap 214 and configured to engage the ram 210 to distribute a force exerted thereon by the ram. As shown in FIG. 3, fasteners (e.g., screws) may be used to attach the load distributor disk to the bottom cap 214. Those skilled in the art will recognize that the load distributor disk may have a shape other than that of a disk. For example, a load distributing member may have a planar form that is square or rectangular shaped.

Figure 5:
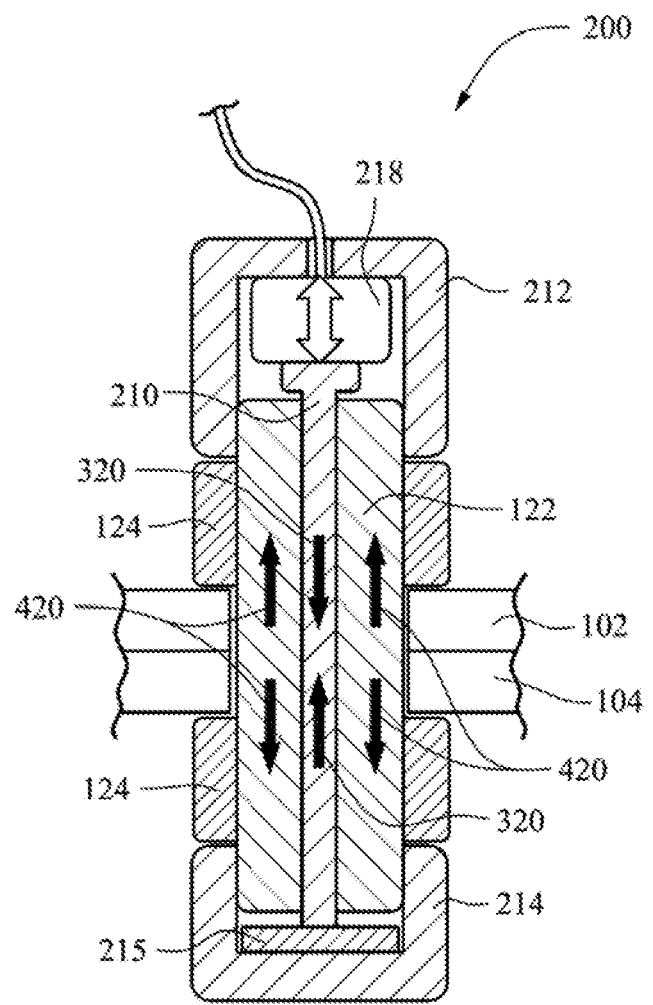
FIG. 5 is a schematic representation of the hydraulic ram stud stretching device according to an example of the disclosed technology.

Turning now to FIG. 5, once the hydraulic ram stud stretching device 200 is assembled onto bolt 122, pressure may be increased to the hydraulic actuator 218 to exert tensile stress on the bolt. That is, the hydraulic actuator 218 is displaced under increased pressure and exerts opposing compressive forces against the top cap 212 and the ram 210. As a result, the ram 210 slides downwardly relative to the bolt 122 to engage the load distributor disk 215 in the bottom cap 214. Due to the force from the hydraulic actuator 218 and engagement with the load distributor disk 215, the ram 210 is placed under compressive stress as indicated by arrows 320.

Still referring to FIG. 5, the hydraulic actuator 218 exerts a compressive force on the top cap 212 which causes the top cap to pull the bolt 122 upwardly. Similarly, compressive force exerted on the bottom cap 214 by the ram 210 causes the bottom cap to pull the bolt 122 downwardly. As a result, the bolt 122 is placed under tensile stress, as indicated by arrows 420. The tensile stress causes the bolt 122 to stretch longitudinally. While the bolt 122 is stretched, the nuts 124 are wound along the bolt to the respective upper and lower flanges. When the hydraulic pressure is released, the bolt behaves like a spring attempting to contract thereby creating a clamping force across the flanges.

Ram 210 may have a continuous, unitary structure, as shown in FIGS. 3-5. In another example, a plurality of sleeve portions 415 may be provided along a ram 410 to provide lateral support to increase the buckling load of the ram, as shown in FIGS. 7 and 8. For example, the sleeve portions 415 may have a diameter of 0.002 inches and be spaced 8 inches apart; however, those skilled in the art will recognize that other configurations will be suitable. The continuous, unitary structure of ram 210 and ram 410 may provide a high buckling critical stress. Also, the bottom of the ram may be cut to customize the length of the ram for a particular stud design.

In another example, shown in FIG. 6, ram 310 may comprise a plurality of segments 311 held together by a wire 313 passing through holes in the segments. In this manner, the end segments may have a standard length while a length of the middle segment may vary to match various stud lengths. While the illustrated example shows three segments 311, those skilled in the art will recognize that any suitable number of segments may be used.

Figure 10:
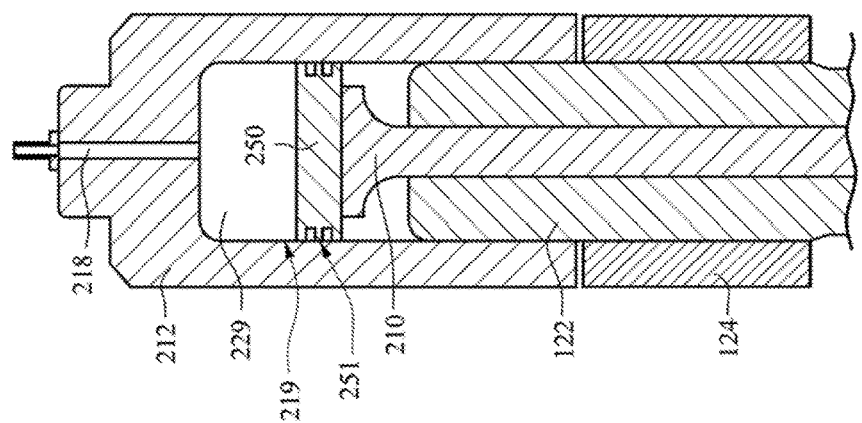
FIG. 10 is a cross-sectional presentation of a hydraulic actuator plate according to an example of the disclosed technology.
Figure 9:
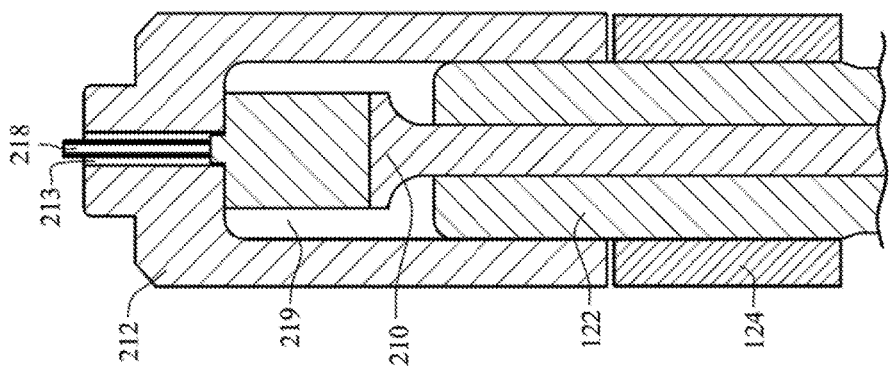
FIG. 9 is a cross-sectional presentation of a hydraulic actuator according to an example of the disclosed technology.

Turning to FIG. 9, as described above, the hydraulic actuator 218 may be disposed within cavity 219. In another example, an actuator plate 250 may be slidably disposed within cavity 219 thus forming a pressure chamber 229 inside the top cap 212, as shown in FIG. 10. In this manner, a hydraulic pump may be connected to the top cap via a hose, for example, to increase pressure in the pressure chamber 229 to cause the actuator plate to engage and move the ram 210 downwardly. One or more seal members 251 may be disposed along a periphery of the actuator plate 250 to engage the top cap to maintain a desired pressure in the pressure chamber 229. A lower hydraulic pressure may be required as compared to the configuration in FIG. 9, due to the upper surface of the actuator plate which provides a larger press area.

Figure 11:
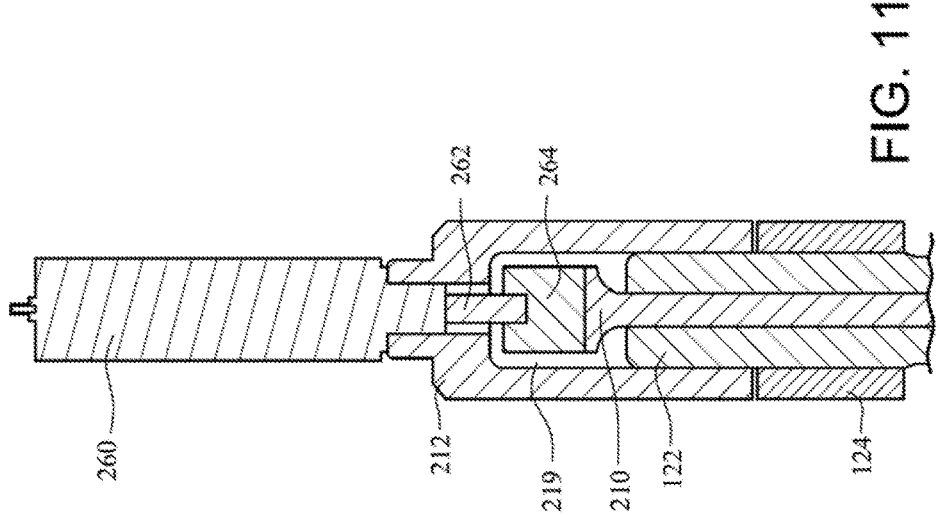
FIG. 11 is a cross-sectional presentation of an external hydraulic pressure chamber according to an example of the disclosed technology.

Referring now to FIG. 11, in another example, a hydraulic pressure chamber 260 is mounted externally of the top cap 212. Pressure in the hydraulic pressure chamber 260 causes an actuator rod 262 to move downwardly thereby displacing actuator block 264 which engages the ram 210. Since the hydraulic pressure chamber 260 is external of the top cap 212, the system is not restricted by the volume of the cavity 219 in the top cap. Instead, multi-stage hydraulic actuation or other suitable means may be used. Hydraulic pressure chamber 260 may be attached to the top cap 212 with a permanent connection (e.g., welding) or a temporary connection (e.g., threading, pinning).

Figure 12:
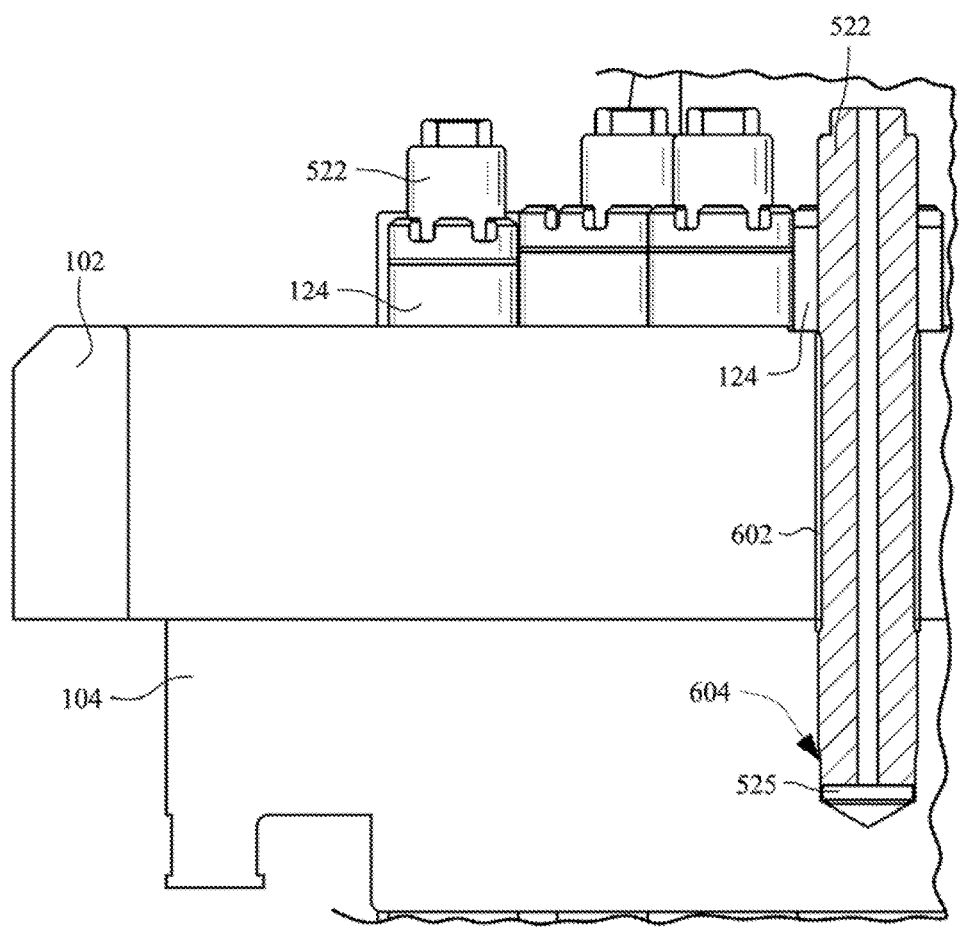
FIG. 12 is a partial perspective view of a section of a turbine shell having studs disposed thereon in accordance with another example of the disclosed technology.
Figures 13, 14:
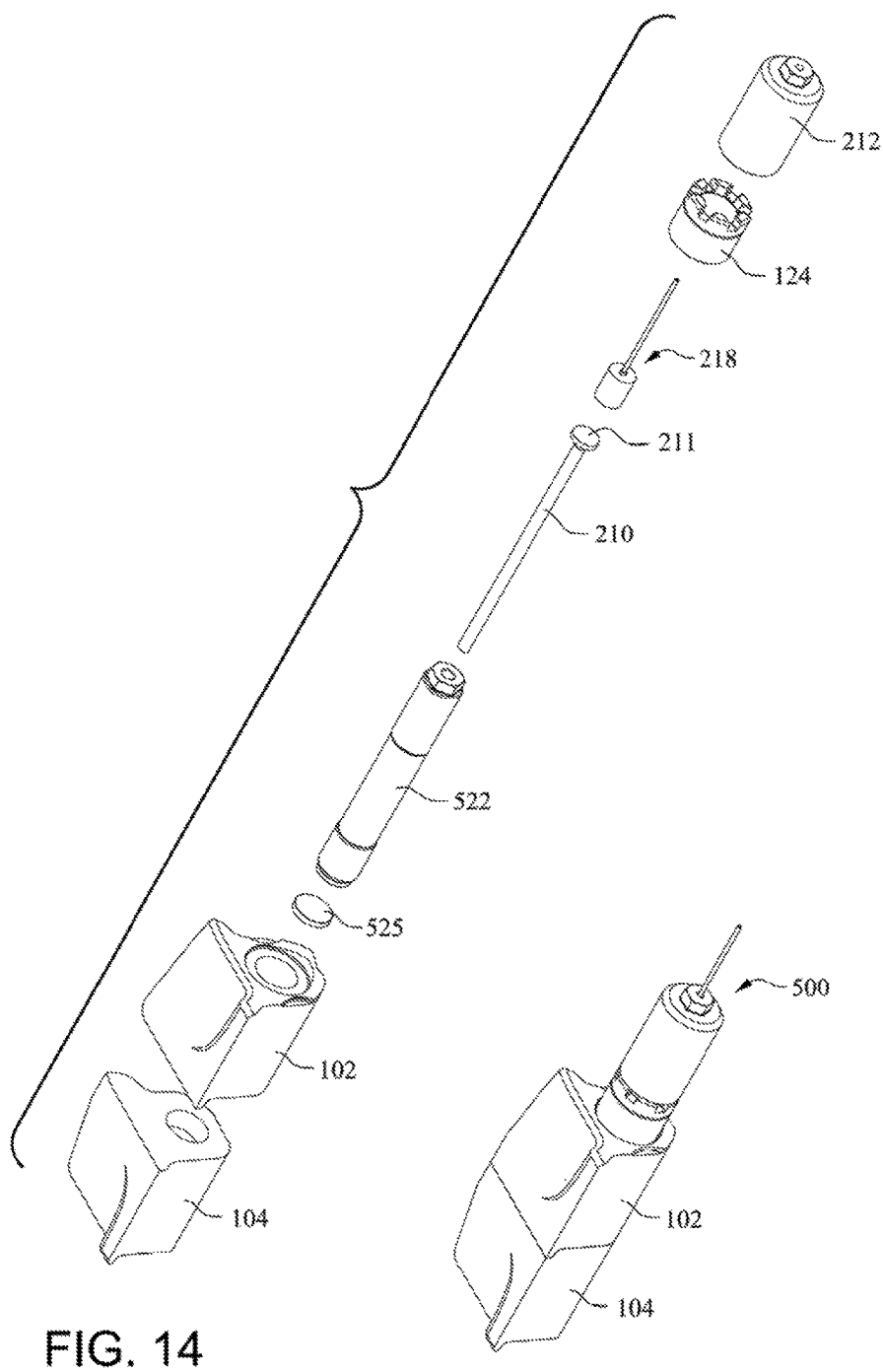
FIG. 13 is a perspective view of a section of the turbine shell of FIG. 12.
FIG. 14 is an exploded perspective view of the turbine shell section of FIG. 13.

Referring to FIGS. 12-14, another section of the turbine shell 1000 is shown. The upper flange 102 and the lower flange 104 are held together by bolts 522 and nuts 124. A though-hole 602 is formed in the upper flange 102, however, a blind hole 604 that is tapped (i.e., threaded) is formed in the lower flange 104. Thus, the bolts 522 do not extend below the lower flange 104; therefore, nuts 124 are not provided to the lower ends of the bolts. The threads formed in the blind hole 604 are configured to engage threads on bolt 522. A hydraulic ram stud stretching device 500 is used to stretch the bolts.

The hydraulic ram stud stretching device 500 is similar to the hydraulic ram stud stretching device 200 discussed earlier and only differences will be described here.

Figure 15:
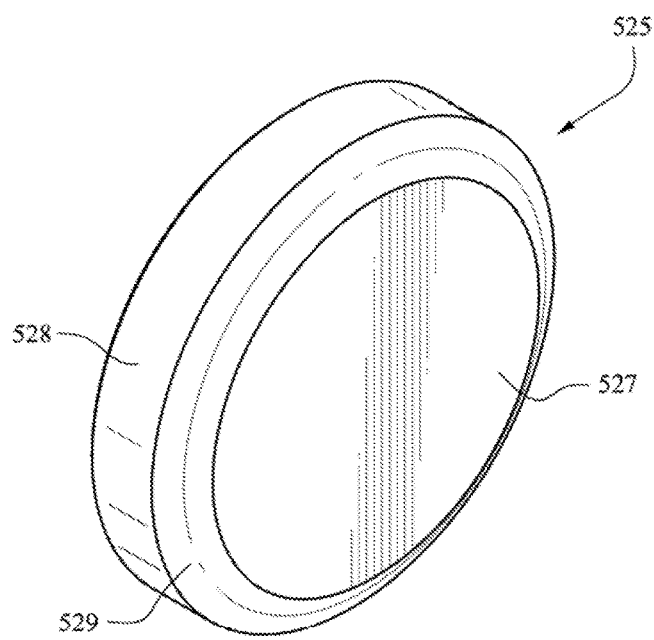
FIG. 15 is a perspective view of a load distributor disk according to an example of the disclosed technology.
Figures 16, 17:
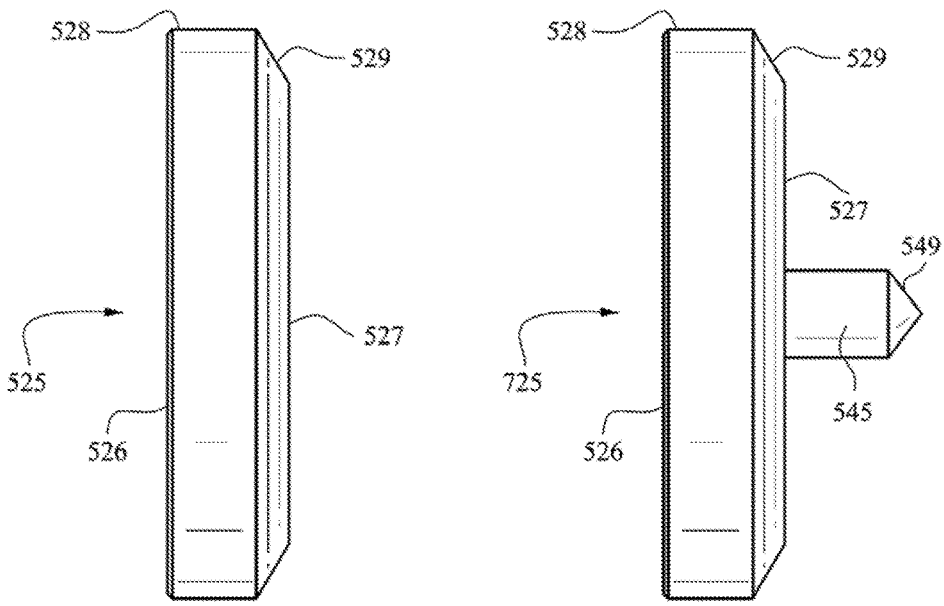
FIG. 16 is a side view of the load distributor disk of FIG. 15.
FIG. 17 is a side view of a load distributor disk according to another example of the disclosed technology.

A bottom load distributor disk 525 is seated at a bottom of the blind hole 604, as shown in FIGS. 20-23. Referring to FIGS. 15 and 16, bottom load distributor disk 525 has a bottom surface 527, a side surface 528, and an angled surface 529 connecting the bottom surface 527 and the side surface 528. An upper surface 526 of the bottom load distributor disk 525 is configured to engage the bolt 522. Instead of initially being seated at a bottom of the blind hole 604, the bottom load distributor disk could be attached to an end of the bolt 522.

The bottom load distributor disk 525 functions to redistribute the high compressive stress in the ram 210 into a lower compressive stress onto the turbine shell 104, since the shell material (e.g., steel) is typically softer than the ram material (e.g., tungsten carbide). The bottom load distributor disk 525 can be made from a high yield stress material (e.g., tungsten carbide). The bottom disk 525 prevents the ram 210 from deforming the turbine shell 104, which would likely cause the ram 210 to become stuck in the turbine shell 104. Those skilled in the art will recognize that the bottom load distributor disk may have a shape other than that of a disk. For example, a load distributing member arranged to be seated at a bottom of the blind hole 604 may have a planar form that is square or rectangular shaped.

Figure 18:
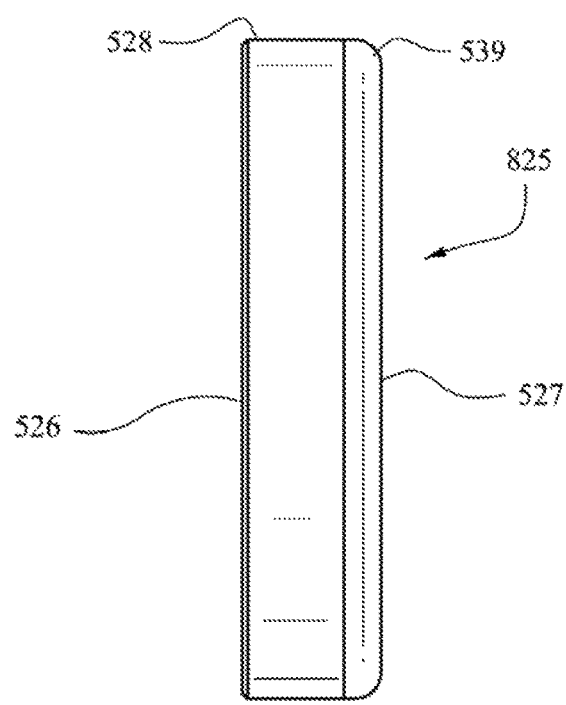
FIG. 18 is a side view of a load distributor disk according to another example of the disclosed technology.
Figure 19:
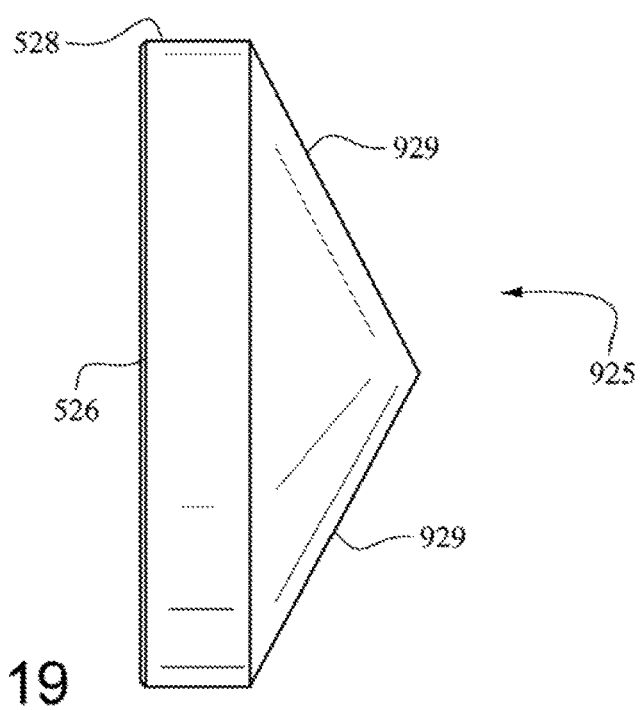
FIG. 19 is a side view of a load distributor disk according to another example of the disclosed technology.

In another example, a bottom load distributor disk 725 includes a post 545 which supports the bottom load distributor disk in the blind hole 604, as shown in FIG. 17. Referring to FIG. 18, a bottom load distributor disk 825 may have a rounded surface 539. In the example shown in FIG. 19, bottom load distributor disk 925 has angled surfaces 929 which intersect at an apex.

Figure 20:
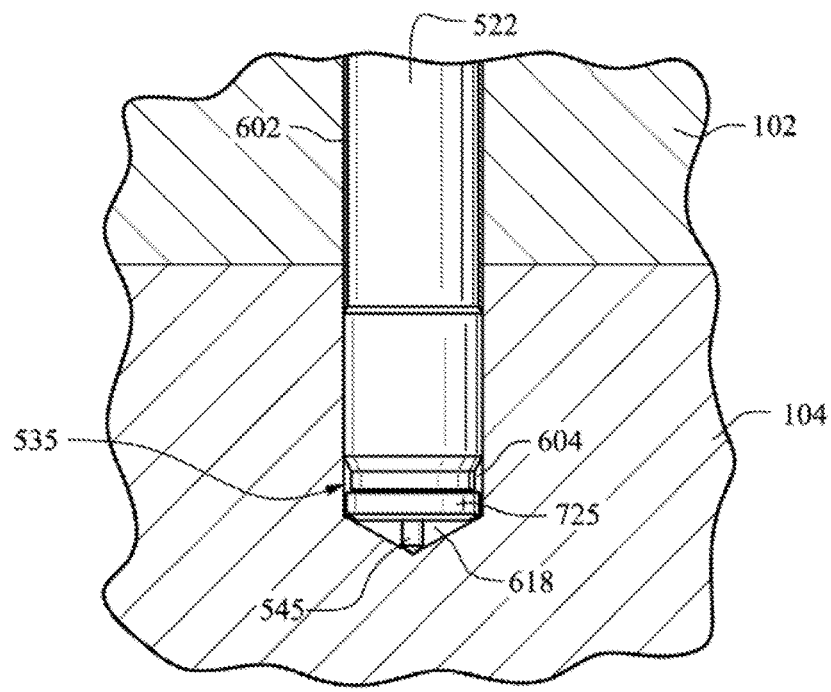
FIG. 20 is a cutaway view of a portion of a hydraulic ram stud stretching device extending into a blind hole in a lower flange of the turbine shell according to an example of the disclosed technology.

Turning to FIG. 20, the blind hole 604 may have an angled bottom 618 formed by a standard twist drill. The angled surface 529 of the bottom load distributor disk may be configured to mate with the angled bottom 618 of the blind hole to stably support the bottom load distributor disk. Post 545 may have an angled surface 549 which mates with the angled bottom 618 so as to further support the bottom load distributor disk. The bolt 522 may have a nose portion 535 having a reduced diameter as compared to an adjacent portion of the bolt.

Figure 21:
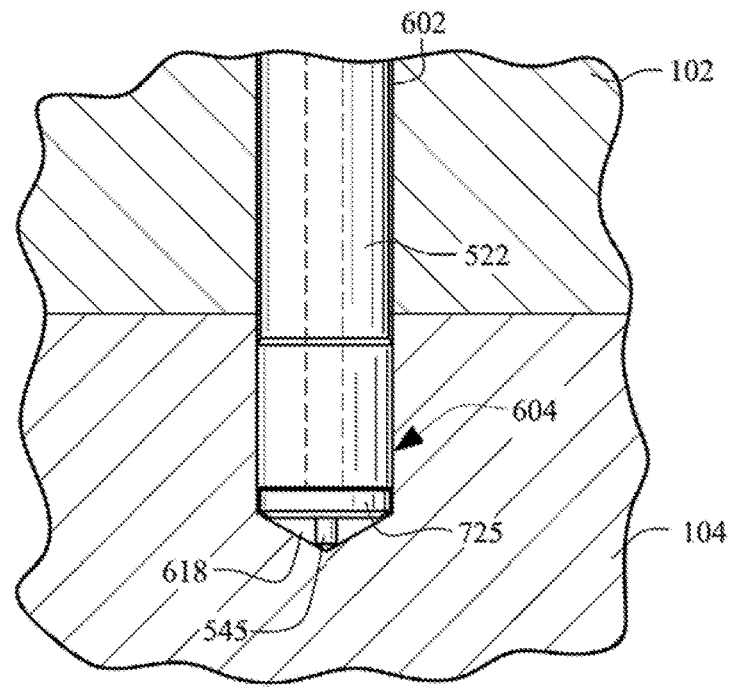
FIG. 21 is a cutaway view of a portion of a hydraulic ram stud stretching device extending into a blind hole in a lower flange of the turbine shell according to another example of the disclosed technology.

Referring to FIG. 21, instead of the reduced-diameter nose portion 535 in FIG. 20, the bolt 522 may have an end portion with a constant diameter. The same bottom load distributor disk 525, 725, 825, 925 (e.g., same dimensions and configuration) can be used with the bolts shown in both FIG. 20 and FIG. 21.

Figure 22:
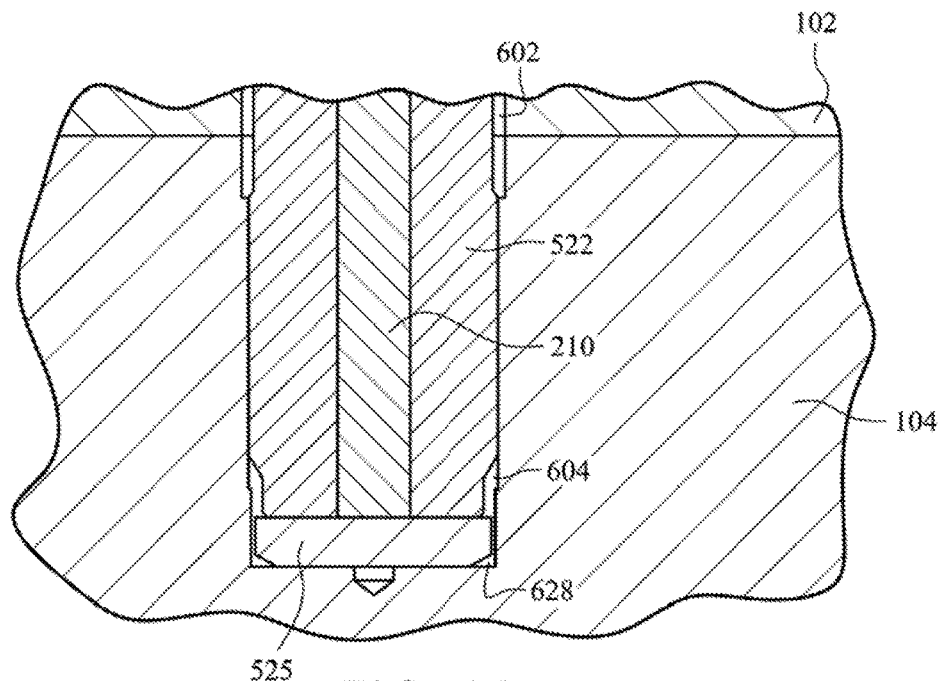
FIG. 22 is a cutaway view of a portion of a hydraulic ram stud stretching device extending into a blind hole in a lower flange of the turbine shell according to another example of the disclosed technology.
Figure 23:
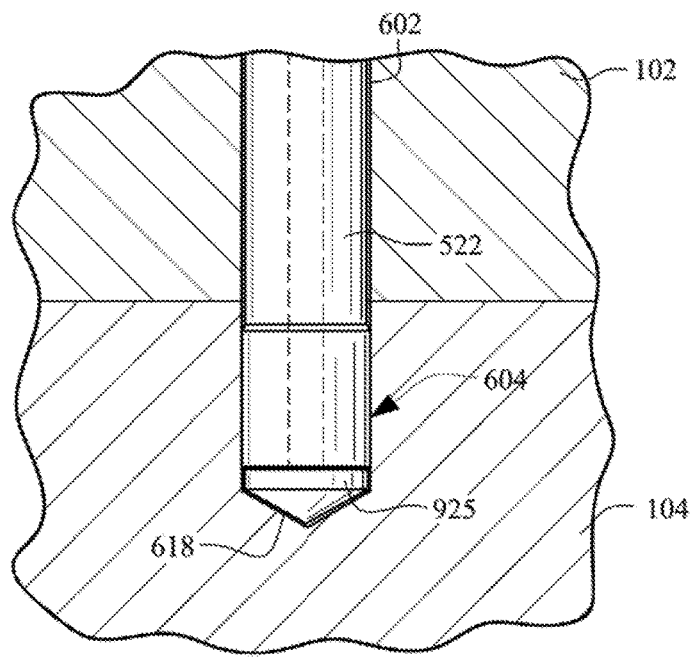
FIG. 23 is a cutaway view of a portion of a hydraulic ram stud stretching device extending into a blind hole in a lower flange of the turbine shell according to another example of the disclosed technology.

In another example shown in FIG. 22, the blind hole 604 may have a flat bottom (e.g., a milled hole). The same bottom load distributor disk 525, 725, 825, 925 used in FIGS. 20 and 21 may be used with this arrangement. As shown in FIG. 22, the bottom surface 527 of the bottom load distributor disk engages the bottom of the blind hole 604. A hole may be formed at the bottom of the blind hole 604 by a pilot drill used during a first boring operation when using a flat bottom drill Referring to FIG. 23, bottom load distributor disk 925 may be disposed to engage the angled bottom 618 of blind hole 604. Bottom load distributor disk 925 may have a wedge shape including angled surfaces 929 which mate with the angled bottom 618 of the blind hole.

Additionally, those skilled in the art will understand that the different configurations of the bolt 522, blind hole 604 and bottom load distributor disk 525, 725, 825, 925 may be used in any combination.

While the invention has been described in connection with what is presently considered to be the most practical and preferred examples, it is to be understood that the invention is not to be limited to the disclosed examples, but on the contrary, is intended to cover various modifications and equivalent arrangements included within the spirit and scope of the appended claims.

What is claimed is:

1. A bolt tensioning assembly, comprising
   a bolt having an elongated configuration, the bolt having a through-hole formed therein extending longitudinally through the bolt such that a pair of openings is respectively formed in opposed end faces of the bolt;
   a ram inserted into the through-hole in the bolt and extending therefrom;
   a top cap configured to be attached to a first end portion of the bolt;
   a load distributing member configured to engage the ram at a location adjacent a second end portion of the bolt to distribute a force exerted thereon by the ram; and
   an actuator connected to the top cap and configured to exert a force on the ram thereby causing the ram to engage the load distributing member such that the bolt is under tensile stress.

2. The bolt tensioning assembly of claim 1, wherein the tensile stress causes the bolt to stretch longitudinally.

3. The bolt tensioning assembly of claim 1, wherein the top cap includes an interior space between the top cap and the bolt into which the ram is moveably received.

4. The bolt tensioning assembly of claim 3, wherein the interior space of the top cap is configured to be pressurized to produce the force on the ram thereby causing the ram to move relative to the bolt.

5. The bolt tensioning assembly of claim 3, wherein the interior space of the top cap includes a piston slidably received therein and configured to exert the force on the ram.

6. The bolt tensioning assembly of claim 1, further comprising a bottom cap configured to be attached to the second end portion of the bolt.

7. The bolt tensioning assembly of claim 6, wherein the load distributing member comprises a load distributor disk disposed in the bottom cap.

8. The bolt tensioning assembly of claim 7, wherein the bolt is configured to extend through a through-hole formed in an upper flange of a turbine shell and through a through-hole formed in a lower flange of the turbine shell to hold the upper flange and the lower flange together.

9. The bolt tensioning assembly of claim 1, wherein the bolt is configured to extend through a through-hole formed in an upper flange of a turbine shell and into a blind hole formed in a lower flange of the turbine shell to hold the upper flange and the lower flange together.

10. The bolt tensioning assembly of claim 9, wherein the load distributing member is a load distributor disk disposed at a bottom of the blind hole.

11. The bolt tensioning assembly of claim 1, wherein the ram is segmented and includes at least two segments held together by a wire passing through the segments.

12. The bolt tensioning assembly of claim 1, wherein the ram includes a plurality of sleeve portions having an increased diameter relative to adjacent portions of the ram.

13. The bolt tensioning assembly of claim 1, wherein the actuator is a hydraulic actuator.

14. A method of tensioning a bolt, comprising:
providing a bolt having an elongate configuration, the bolt having a through-hole formed therein extending longitudinally through the bolt such that a pair of openings is respectively formed in opposed end faces of the bolt;
inserting a ram into the through-hole;
attaching a top cap to a first end portion of the bolt;
providing a load distributing member at a location adjacent a second end portion of the bolt to engage the ram and receive a force exerted thereon by the ram;
providing an actuator coupled to the top cap; and
exerting a force on the ram with the actuator thereby causing the ram to engage the load distributing member such that the bolt is under tensile stress.

15. The method of claim 14, further comprising stretching the bolt under the tensile stress.

16. The method of claim 14, wherein the top cap includes an interior space between the top cap and the bolt into which the ram is moveably received.

17. The method of claim 14, wherein the step of exerting a force on the ram includes pressurizing the interior space of the top cap to produce the force on the ram thereby causing the ram to move relative to the bolt, and
wherein the actuator is a hydraulic actuator.

18. The method of claim 14, attaching a bottom cap to the second end portion of the bolt, wherein the load distributing member comprises a load distributor disk disposed in the bottom cap.

19. The method of claim 14, wherein the step of providing the bolt includes passing the bolt through a through-hole formed in an upper flange of a turbine shell and through a through-hole formed in a lower flange of the turbine shell to hold the upper flange and the lower flange together.

20. The method of claim 14, wherein the step of providing the bolt includes passing the bolt through a through-hole formed in an upper flange of a turbine shell and into a blind hole formed in a lower flange of the turbine shell to hold the upper flange and the lower flange together.

* * * * *